United States Patent [19]

Merritt et al.

[11] 4,359,564

[45] Nov. 16, 1982

[54] ADDITION POLYMER OF OLIGOMERIC POLYESTERS OF ACRYLIC ACID

[75] Inventors: Richard F. Merritt, Fort Washington; Bjorn E. Larsson, Rushland, both of Pa.

[73] Assignee: Rohm & Haas Co., Philadelphia, Pa.

[21] Appl. No.: 130,323

[22] Filed: Mar. 14, 1980

[51] Int. Cl.$^3$ ............................................... C08F 20/04
[52] U.S. Cl. .................................. 526/260; 526/265; 526/271; 526/287; 526/304; 526/307.6; 526/312; 526/317
[58] Field of Search ............. 526/317, 303, 312, 271, 526/304, 287, 265, 260, 307.6

[56] References Cited

U.S. PATENT DOCUMENTS

| | | | |
|---|---|---|---|
| 3,210,325 | 10/1965 | De Witt et al. .................. | 526/317 |
| 3,266,930 | 8/1966 | Emmons et al. .................. | 117/132 |
| 3,622,651 | 11/1971 | Vasta .............................. | 260/31.2 N |
| 3,888,912 | 6/1975 | Burguette ........................ | 204/159.22 |
| 4,048,259 | 9/1977 | Wegemund et al. .............. | 526/318 |

FOREIGN PATENT DOCUMENTS 2014861 11/1970 Fed. Rep. of Germany .
3045 12/1978 Fed. Rep. of Germany .

OTHER PUBLICATIONS

Yamada et al., *Polymer Letters Edition*, John Wiley & Sons, N.Y., vol. 14, pp. 277–281, (1976).
Saegusa et al., *Macromolecules*, 7, pp. 256–258, (1974).

Primary Examiner—Harry Wong, Jr.

[57] ABSTRACT

Disclosed are homopolymers and copolymers of a monomer or a mixture of monomers having the formula

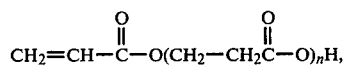

in which the average value of n ($\bar{n}$) is in the range from greater than 1 to about 10, being oligomeric usually prepared from acrylic acid. In the mixtures of such monomers, the number n may range from 1 to 30 or more. Also disclosed are methods of preparing the polymers, methods of using them, and articles of manufacture containing the polymers.

10 Claims, No Drawings

ADDITION POLYMER OF OLIGOMERIC POLYESTERS OF ACRYLIC ACID

BRIEF SUMMARY OF THE INVENTION

This invention relates to homopolymers and copolymers of a monomer or a mixture of monomers having the formula $$CH_2=CH-\overset{O}{\underset{\|}{C}}-O(CH_2-CH_2\overset{O}{\underset{\|}{C}}-O)_nH,$$

in which the average value of n ($\bar{n}$) has a value greater than 1 to about 10, being oligomeric polyester-acids prepared from acrylic acid. The invention includes methods for preparing free-radical addition polymers of the monomers depicted above, the polymers themselves, and articles comprising these polymers. The depicted monomer is an oligomer comprising one or more polyester units and terminating in an acid unit, and is, surprisingly, an effective softening monomer, in copolymers.

BACKGROUND OF THE INVENTION

Yamada et al., in Polymer Letters Edition, John Wiley & Sons, New York, Vol. 14 pages 277–281, 1976, herein incorporated by reference, describes the preparation of the oligomer and the isolation of fractions having values of $\bar{n}$ ranging from 0.9 to 13.5. In a communication to the editor of *Macromolecules,* Vol. 7, pages 256 to 258, 1974, herein incorporated by reference, Saegusa et al. teach an earlier preparation of the oligomers. The preparation of the molecule wherein n equals 1 is described by Burguette in U.S. Pat. No. 3,888,912 which further discloses certain polymers of that material. Other uses for the n equals 1 compound, acryloxypropionic acid (referred to herein below as AOPA), are given in U.S. Pat. No. 3,266,930 and 4,048,259 wherein AOPA, a vinyl monomer, is used as a reactive component in coatings and adhesives.

DETAILED DESCRIPTION

The free radical addition polymers of this invention are polymers of one or more ethylenically unsaturated monomers wherein at least one of the monomers is of the formula $$CH_2=CH-\overset{O}{\underset{\|}{C}}-O(CH_2-CH_2\overset{O}{\underset{\|}{C}}-O)_nH \quad \text{(Formula I)}$$

in which n has a value in the range from greater than 1 to about 10, wherein $\bar{n}$ is the average degree of polymerization of acrylic acid. Each molecule in a sample of the oligomer is represented by formula I wherein n is an integer. For a given sample the average of these integers is the value of $\bar{n}$ which, of course, need not be integral. In any sample of oligomeric acrylic acid (hereinafter o-AA), i.e., a sample of molecules of formula I wherein $\bar{n}$ is greater than 1, individual molecules have integral values of n from 0 to very large numbers but molecules with values of n being very large, perhaps greater than 30, are very few. For the most part the o-AA of this invention comprises molecules of formula I in which the molecules have integral values of n in the range 0 to 30. Formula I wherein n equals 0 represents acrylic acid (AA) the precursor from which the oligomers are normally prepared. Formula I wherein n equals 1 represents acryloxypropionic acid (AOPA), the Michael addition dimer of acrylic acid.

As will be seen in more detail below, each of these acids, AA and AOPA, is a hardening acid by which is meant that its incorporation in a high polymer contributes to the glass transition temperature (Tg) of the polymer being above room temperature (20° C.). In marked contrast o-AA, of this invention, contributes to the Tg being below room temperature. In o-AA samples having low values of $\bar{n}$ there are appreciable amounts of AA and AOPA along with molecules having higher n values. Samples of o-AA having high values of $\bar{n}$ will have little if any AA or AOPA and will consist predominently of molecules having higher values of n.

Homopolymer and copolymer data indicate that the Tg of high polymers of o-AA is far below room temperature, such as the neighborhood of −25° C. (and may range up or down from this value by 10° C. or more depending on the value of $\bar{n}$). Thus the o-AA mer units in a polymer contribute a remarkable Tg lowering effect, to copolymers in which these mers are employed, when compared with commonly used acid mer units such as AA (105° C.), methacrylic acid (230° C.), and itaconic acid (105° C.); the numbers in parenthesis being high molecular weight Tg values.

One of the outstanding features of o-AA is that it copolymerizes in free radical initiated polymerization with great facility, being comparable with AA, methacrylic acid and itaconic acid in this respect.

The acid group in polymers comprising o-AA mer units is surprisingly reactive, leading to faster and more complete reaction with various chemicals such as crosslinking reactants and other polymers. In both of the latter types of reactions incomplete reaction with the polymer is commonplace and slow reactions, particularly in polymer-polymer reactions are usual. Although we do not wish to be bound by any theoretical depiction of a reaction mechanism, it is hypothesized that the long length of the chain between the polymer backbone and the acid group in o-AA mers is responsible for the high rate and degree of reaction. The reason for this is believed to be the comparatively free accessability of the carboxyl group in the o-AA polymer whereas in the case of the other acid mer units the folding of the polymer chain, in its usual configurations, tends to occlude the carboxyl group. Thus thickener polymers employing o-AA mer units develop their full viscosity rapidly when treated with base in aqueous systems and exhibit unexpectedly little pH drift compared to polymers employing other acid mer units.

Polymers employing oligomers wherein $\bar{n}$ is 2 to about 5 are preferred. At least 0.1% of the oligomer of formula I is usually present in the monomers used to make the polymer but more usually the amount is between 0.5 and 75% with 1 to 25% being preferred. The comonomers are preferably alpha,beta ethylenically unsaturated and include polyunsaturated monomers, preferably present in small amounts such as less than 5% and preferably 0.1 to 0.5%. Copolymers employing more than 75% o-AA are of use in some areas and indeed homopolymers of o-AA are also useful. The other polymers preferably comprise an ester of at least one of acrylic acid and methacrylic acid and more preferably these being one to 18 carbon ($C_1$–$C_{18}$) alkyl esters of one or another of these acids or mixtures of these. Still more preferred are the $C_1$ to $C_8$ alkyl esters of acrylic and methacrylic acids, i.e. (meth)acrylic acids.

Other preferred comonomers are (meth)acrylamide, (meth)acrylonitrile, dimethylamino-ethyl (meth)acrylate, a ($C_2$–$C_4$)diol di(meth)-acrylate, a hydroxy($C_2$–$C_3$)alkyl (meth)acrylate, itaconic acid and its esters and half esters, (meth)-acrylic acid, maleic anhydride, diallyl phthalate, allyl (meth)acrylate, N-methylol (meth)acrylamide, oxazolidinylethyl (meth)acrylate, styrene, unsaturated hydrocarbons such as divinyl benzene, ethylene, propylene, isoprene and vinyl toluene, sodium vinyl sulfonate, t-butylaminoethyl (meth)acrylate, vinyl acetate, vinyl esters of carboxylic acids, such as vinyl acetate, vinyl butyrate and vinyl decanoate, vinyl chloride, vinylidene chloride, and 4-vinylpyridine.

This invention also concerns the method of preparing polymers comprising o-AA mers. The preferred methods are solution polymerization and most preferred emulsion polymerization. Another preferred embodiment is an aqueous solution of the polymer of this invention made as such or obtained by partial or complete neutralization of the acid by basic materials such as alkalis, ammonia and amines.

The polymer of this invention is useful in various articles of manufacture such as in formulating coatings for various substrates including hard substrates, fibrous materials substrates and both porous and non-porous substrates in general, ink, caulking compositions, and adhesives, including contact adhesives and pigmented coatings compositions. In these formulations the polymers can serve various functions, such as binder, thickener, release agent, holdout or antimigration agent, rheology modifier or combinations of these. More specifically the polymers can be employed as alkali soluble thickeners with, if desired, capacity to act as a binder or as a crosslinkable polymer useful in the functions noted above. Typical uses given below include uses as binders for nonwoven fabrics, as the thickener/binder in a fabric print paste for printing fabrics and as a sole binder/thickener in a printing ink.

In general, the polymers and copolymers may be used in the formation of coatings, impregnants, and adhesives for paper, textiles, leather, wood, and metals. Copolymers, particularly those containing from 5 to 25% by weight of the unsaturated monomers of the invention can be mixed with polyepoxides for the production of insoluble and infusible cross-linked coatings and polymeric objects. The copolymers may be employed in conjunction with other polymeric material for the production of special compositions for special uses.

Examples of the ethylenically unsaturated comonomers of this invention include the $\alpha,\beta$-ethylenically unsaturated monocarboxylic acids and esters (including glycol diesters) and amides thereof, $\alpha,\beta$-ethylenically unsaturated aldehydes, $\alpha,\beta$-ethylenically unsaturated dicarboxylic acids and esters, amides, half esters, and half amides thereof, $\alpha,\beta$-ethylenically unsaturated nitriles, hydrocarbons such as $\alpha$-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amides and salts thereof, vinyl ureido monomers, vinyl compounds having heterocyclic nitrogen-containing (HN<) groups, and halogen, hydroxyalkyl, or aminoalkyl substituted derivatives thereof.

Specific examples of suitable comonomers which may be copolymerized with o-AA, to obtain the copolymers of the invention, are unsaturated acid monomers and esters thereof, being esters of alkanols having one to 20 carbon atoms, such as methanol, ethanol, butanol, pentadecanol and the like, also acrolein, methacrolein, ethylene, propylene, isobutene, butadiene, isoprene, chloroprene, styrene, vinyl toluene, vinyl methyl ether, vinyl isobutyl ether, vinyl chloride, vinyl bromide, vinylidene chloride, vinyl sulfide, vinyl acetate, vinyl propionate, vinyl decanoate, the vinyl pyridines; primary amino compounds such as $\beta$-aminoethyl vinyl ether, aminopentyl vinyl ether; secondary amino-containing compounds such as t-butylaminoethyl methacrylate; tertiary amino containing compounds such as dimethylaminoethyl methacrylate, and the corresponding amine salts such as the chloride or hydroxide, and ureido monomers such as are disclosed in U.S. Pat. No. 3,356,627 to Scott.

As is described below, these vinyl monomers include the acids mentioned above and esters thereof, as well as known "soft" and "hard" monomers.

A preferred monomer, for addition to the o-AA monomer, usually utilized in a substantial proportion to prepare the polymer, is a resiliency-imparting or soft monomer which may be represented by the following formula:

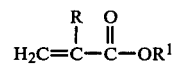

wherein R is H or alkyl having 1 to 4 carbon atoms and $R^1$ is the straight chain or branched chain radical of a primary or secondary alkanol, alkoxyalkanol or alkylthioalkanol, and having up to about 18 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, methoxymethyl, ethoxymethyl, cyclohexyl, n-hexyl, isobutyl, ethylthioethyl, methylthioethyl, ethylthiopropyl, n-octyl, nonyl, decyl, dodecyl, octadecyl and the like. When R is alkyl and $R^1$ is alkyl, $R^1$ should have from about 6 to about 18 carbon atoms and when R is H and $R^1$ is alkyl, $R^1$ should have from about two to about 18 carbon atoms, in order to qualify as a soft monomer. Preferably R is H and $R^1$ has from 4 to 8 carbon atoms.

As is apparent, an important property of the polymer is the Tg thereof, and consequently the selection of monomers and proportions thereof depends upon their influence on the Tg. "Tg" is a conventional criterion of polymer hardness and is described by Flory, "Principles of Polymer Chemistry", pp. 56 and 57 (1953), Cornell University Press. See also "Polymer Handbook", Brandrup and Immergut, Ed., Sec. III, pp. 61–63, Interscience (1966). While actual measurement of the Tg of copolymers is preferred, it may be calculated as described by Fox, Bull. Am. Physics Soc. 1,3, p. 123 (1956), or by the use of "Rohm and Haas Acrylic Glass Temperature Analyzer" Publication No. CM-24 L/cb, Rohm and Haas Company, Philadelphia, Pa., 19105. The preferred method for determining Tg is differential scanning calorimetry employing a ca 50 mg. (10 to 100 mg.) sample and a rate of heating of 20° C. per minute. Commercial calorimeters such as those produced by DuPont Instruments Div. or Perkin-Elmer Corp. may be used following the instructions furnished therewith. As reported by Lee and Knight in Section III of "Polymer Handbook", supra, different methods, rates of measurement, sample purities etc. may lead to somewhat different values of Tg being reported for a given polymer. Thus for intercomparisons with literature values it is desirable to use a well known polymer for establishing the presence of a possible systematic difference due to these variables. The poly(ethyl acrylate) of Example 5(c), infra, may so serve.

The polymers and copolymers of the compounds of Formula I may be prepared by any of the known addition polymerization methods such as bulk, solution, or aqueous emulsion techniques. A preferred method is a solution polymerization using organic solvents, such as acetone, dioxane, dimethylformamide, and acetonitrile and azo catalysts such as diazodiisobutyronitrile and dimethyl-α,α'-azodiisobutyrate. The proportion of azo catalyst or initiator may be between 0.1% and 5% and is preferably between about 0.5% and 1.5%, on the weight of the total polymerizable monomers.

In the preparation of the present copolymers by emulsion polymerization techniques, the emulsifiers or dispersing agents employed and general emulsion polymerization techniques are taught in "Emulsion Polymerization" by F. A. Bovey et al., Interscience Publishers, 1965, and "Emulsion Polymerization" by D. C. Blackley, John Wiley & Sons, publishers, 1975. The polymerizable monomer emulsions can be prepared at a temperature in the range of from about 0° C. to about 100° C. and, if a pressurized reactor is used, even higher, but intermediate temperatures are generally preferred. Although other free radical initiators are useful, peroxide free-radical catalysts, particularly catalytic systems of the redox type, are recommended. Such systems, as is well known, are combinations of oxidizing agents and reducing agents such as a combination of potassium persulfate and sodium metabisulfate. Suitable peroxidic agents include the "persalts" such as the alkali metal and ammonium persulfates and perborates, hydrogen peroxide, organic hydroperoxides, such as tert-butyl hydroperoxide and cumene hydroperoxide, and esters such as tert-butyl perbenzoate. Reducing agents include water-soluble thiosulfates, hydrosulfites, tertiary amines, such as triethanolamine and the like, thiourea and salts of metals such as the sulfate salts of metals capable of existing in more than one valence state such as cobalt, iron, nickel, and copper.

A convenient method for preparing the copolymer latex comprises agitating an aqueous suspension or emulsion of the mixture of copolymerizable monomers and redox catalytic combination at room temperature without the application of external heat. The amount of catalyst can vary but the usual range is from 0.01 to 3.0% peroxidic agent and the same or lower proportions of the reducing agent based on the weight of the monomer. In this way, it is possible to prepare latices which contain as little as 1% and as much as 60% or even more of the resinous copolymers on a weight basis. It is more practical and preferred to produce latices which contain from about 30 to about 50% resin solids.

If desired, a chain-transfer agent is used to moderate the molecular weight of the copolymer obtained by these methods. The art-known chain-transfer agents may be used, such as: long-chain alkyl mercaptans, such as t-dodecyl mercaptan; alcohols, such as isopropanol, isobutanol, lauryl alcohol, and t-octyl alcohol; halogenated hydrocarbons, such as carbon tetrachloride, tetrachloroethylene and trichlorobromethane. Generally, from about 0 to 3%, by weight, based on the weight of the monomer charge, of the chain-transfer agent is used.

In examples and elsewhere herein, parts and percentages are by weight and temperatures in degrees Celcius unless otherwise indicated. The following examples are illustrations designed to assist those skilled in the art to practice the present invention but are not intended to limit the invention in any way. The various monomers and other chemicals used in the examples are commercial grade materials unless otherwise specified. Changes and variations may be made without departing from the spirit and scope of the invention as defined by the appended claims.

The following abbreviations are used in the examples:

| | |
|---|---|
| MEHQ | monomethyl ether of hydroquinone |
| HQ | hydroquinone |
| GPC | gel permeation chromatography |
| ME/g | milliequivalents per gram of solids |
| AA | acrylic acid |
| o-AA | polymer of Formula I with n greater than 1 |
| Tg | glass transition temperature |
| SLS | sodium lauryl sulfate |
| NaPS | sodium persulfate |
| tBHP | t-butyl hydroperoxide |
| AOPA | acryloxy propionic acid |
| EA | ethyl acrylate |
| DSC | differential scanning calorimetry |
| ALMA | allyl methacrylate |
| BA | n-butyl acrylate |
| AN | acrylonitrile |
| AM | acrylamide |
| MlAM | N—methylolacrylamide |
| IA | itaconic acid |
| DS-4 | sodium dodecyl benzene sulfonate (23%) |
| DS-10 | sodium dodecyl benzene sulfonate (100%) |
| T300 | the temperature, °C., at which the 10 second torsional modulus is 30 kg/sq. cm. |
| VAc | vinyl acetate |
| St | styrene |

EXAMPLE 1

Preparation of o-AA in Crown Ether Solution

The following reaction mixture is heated at 80° C. for 300 hours in a closed vessel: 10 parts acrylic acid; 0.08 parts monomethyl ether of hydroquinone (MEHQ); 1.8 parts -18-Crown-6 ether (1,4,7,10,13,16 hexaoxacyclooctadecane); 0.76 parts potassium acrylate. The acid titer decreased from 13.7 to 3.5 ME/g. Gel permeation chromatography showed the presence of molecules with values of n ranging from 0 through 9. The weight average value of n derived from the GPC data and the titration data is $\bar{n}=3$.

EXAMPLE 2

Preparation of o-AA Using Amberlyst Catalyst

| | Parts By Weight | | |
|---|---|---|---|
| | 2(a) | 2(b) | 2(c) |
| Acrylic acid | 100 | 100 | 100 |
| Amberlyst$^R$ 15 Catalyst | 20 | 20 | 6.6 |
| HQ inhibitor | 0.075 | 0.075 | 0.075 |
| MEHQ inhibitor | 0.075 | 0.075 | 0.075 |

The mixture of acrylic acid, Amberlyst 15, a strongly acidic sulfonic acid ion exchange resin catalyst manufactured by Rohm and Haas Co., Philadelphia, Pa., and inhibitors is heated to 120°–125° C. with stirring in a 300 ml round-bottom flask equipped with condenser, thermometer and stirrer with loosely fitting bearing. Mixture 2(a) is heated for 9.5 hrs., mixtures 2(b) and 2(c) for 20 hrs. The course of the reaction is followed by determining acid titer of the samples. Final acid titers of 2(a), 2(b) and 2(c) are 5.7, 4.7 and 5.7 ME/g corresponding to $\bar{n}$ values of 1.4, 2.0 and 1.4 respectively ($\bar{n}$ by GPC is 2.0 for 2(b); n's ranging from 0–9).

EXAMPLE 3

Hompolymer of o-AA (a) o-AA, prepared as in Example 1, is washed with water to remove water soluble components and then heated with 5% Lupersol$^R$ 11 (t-butyl perpivalate—75%) at 80° C. to obtain a sticky polymer which, after washing with methanol and drying, has a Tg of −30° C., determined by DSC.

(b) o-AA, prepared as in Example 2(a), is polymerized by heating the following emulsified mixture at 60° C. under $N_2$:
3.1 parts o-AA
9.35 parts $H_2O$
0.3 parts SLS (28%)
0.035 parts NaPS
0.04 parts sodium hydrosulfite
0.05 parts tBHP
0.5 parts 0.15% $FeSO_4.7H_2O$
The polymer coagulated during the polymerization. After stirring with excess water to extract soluble components the polymer is dried for 15 minutes at 150° C. The soft polymer has a Tg of −19° C.

(c) o-AA, prepared as in Example 2(b), is polymerized by heating the following emulsified mixture at 50°–60° C. under $N_2$ for 1 hour.
5.0 parts o-AA
15.0 parts $H_2O$
0.2 parts Siponate DS-10
0.02 parts NaPS
The polymer coagulated during the polymerization. After stirring with water to extract water soluble components the polymer is dried 15 minutes at 150° C. The soft polymer has a Tg of −33° C.

EXAMPLE 4

Copolymers of o-AA, AOPA and AA

Emulsion copolymers of EA with 10% AA, 20% AOPA and 20% o-AA (prepared by the method of Example 2b) are prepared by conventional polymerization techniques. The charge compositions are in parts by weight:

|  | 4(a) | 4(b) | 4(c) |
|---|---|---|---|
| SLS | 2.0 | 2.0 | 2.0 |
| $H_2O$ | 88 | 88 | 88 |
| EA | 22.5 | 20 | 20 |
| AA | 2.5 | — | — |
| AOPA | — | 5 | — |
| o-AA | — | — | 5 |
| $Fe^{++}$ (0.15%) | 1 | 1 | 1 |
| NaPS/$H_2O$ | 0.1/3 | 0.1/3 | 0.1/3 |
| $NaHSO_3$/$H_2O$ | 0.02/2 | 0.02/2 | 0.02/2 |

SLS, $H_2O$ and monomers are mixed in a flask equipped with thermometer, stirrer, condenser and $N_2$ inlet; heated to 50° C. under $N_2$ and catalyst is added in the order shown. Polymerization heat causes the temperature to rise to 80° C., at which temperature it is held for 1 hour. The Tg of the dried polymers 4(a), 4(b) and 4(c) are +3, −3, −13° C., respectively. Acid titers of the corresponding emulsions are 0.269, 0.299 and 0.25 ME/g, respectively, in close agreement with expectation.

The examples show the small effect on Tg of o-AA in EA copolymers relative to two other acid functional monomers, AA and AOPA, which contribute hardness to the copolymers.

EXAMPLE 5

Copolymers of EA and o-AA

Emulsion polymers of EA and o-AA are prepared, by conventional processes, with the compositions EA/o-AA, 52/48, 88/12 and 100/0 using the following charges, in parts by weight, and conditions:

|  | 5(a) | 5(b) | 5(c) |
|---|---|---|---|
| DS-10 | 1.0 | 1.0 | 1.0 |
| $H_2O$ | 180.0 | 180.0 | 180.0 |
| EA | 13.0 | 22.0 | 25.0 |
| o-AA, Ex. 2(b) | 12.0 | 3.0 | — |
| NaPS/$H_2O$ | 0.12/3 | 0.12/3 | 0.12/3 |
| Polymerization temp. | 50–70 | 50–70 | 50–70 |
| Tg (DSC) | −24° C. | −14 | −13 |

The Tg data show that o-AA actually lowers the Tg of the copolymer; thus o-AA is a softening comonomer even with respect to EA. At low concentrations the lowering is small.

EXAMPLE 6

Alkali-Soluble Copolymers based on o-AA

EA/o-AA (prepared as in Example 2b), 40/60 parts, copolymer emulsions with 0, 0.1 and 0.2 parts allyl methacrylate, 6(a), 6(b), and 6(c) respectively, are made by conventional emulsion polymerization. The polymers are characterized in respect to Tg and viscosity of the solubilized emulsion as shown below.

|  | Polymer | | | Tg | Viscosity - 2.3% Solids |
|---|---|---|---|---|---|
| Ex. | EA | o-AA | ALMA | (DSC) | at pH 6.5 with NaOH |
| 6(a) | 40 | 60 | — | −11 | 64.0 cps |
| 6(b) | 39.9 | 60 | 0.1 | — | 121.0 cps |
| 6(c) | 39.8 | 60 | 0.2 | −10 | 7000.0 cps |

Allyl methacrylate (ALMA) is used as a crosslinker and molecular weight extender. The polymers "solubilized" at pH 7 and at pH 6.5 showed increasing viscosity with increasing ALMA. Performance of Example 6(c) polymer as a sole binder/thickener for printing inks is comparable to a control made with AA, in place of o-AA, but without the stiffening effect of the AA control which has a calculated Tg of +33° C.

EXAMPLE 7

Copolymers Comprising o-AA and Acrylamide or Methylolated Acrylamide

Conventional thermal and redox emulsion polymerization processes are used to prepare copolymers capable of self-crosslinking or crosslinking with post-additives such as aminoplast resins. These polymers are characterized by their torsional modulus. The temperature where the modulus is 300 kg/cm$^2$ is an approximation of the Tg; usually being ca. 15° C. higher. The compositions in wt. % and data are:

| Ex. | EA | BA | AN | MIAM or Am | IA | o-AA | Process | Soap (%) | $T_{300}$ °C. |
|---|---|---|---|---|---|---|---|---|---|
| 7(a) | 96 | — | — | 2.5 MIAm | 1.5 | — | thermal | 0.1 SLS | −4 |
| 7(b) | 76 | — | — | 2.5 MIAM | 1.5 | 20 | thermal | 0.1 SLS | −2 |
| 7(c) | 66 | 25.5 | 4.5 | 2.5 MIAM | 1.5 | — | thermal | 0.1 SLS | −13 |
| 7(d) | 62.5 | 25.5 | 4.5 | 2.5 MIAM | — | 5 | thermal | 0.1 SLS | −15 |
| 7(e) | 62.5 | 25.5 | — | 2.5 MIAM | — | 9.5 | thermal | 0.1 SLS | −20 |
| 7(f) | 52.5 | 25.0 | — | 2.5 MIAM | — | 20 | thermal | 0.1 SLS | −19 |
| 7(g) | 48 | 48 | — | 3.0 MIAM | 1 AA | — | redox | 0.1 DS-4 | −30 |
| 7(h) | 39.5 | 47.5 | — | 3.0 MIAM | — | 10 | redox | 0.1 DS-4 | −28 |
| 7(i) | 40.0 | 47.5 | — | 2.5 Am | — | 10 | redox | 0.1 DS-4 | −25 |

The o-AA is prepared by the process of Example 2b.

Results above show that replacing EA with 5–20% o-AA had little effect on $T_{300}$ of copolymers made by conventional thermal and redox emulsion polymerization process. Polymer films made from Example 7(e) and 7(f) are swollen less in a typical drycleaning solvent, perchloroethylene, than those of Example 7(c) and 7(d) showing that o-AA contributes to solvent resistance as well as decreasing the $T_{300}$. The latex of Example 7(i) is crosslinked with 5% (solids on latex solids) of a methoxymethyl melamine and 0.5% ammonium nitrate which when cast and air dried at room temperature has a torsional modulus over ten times that of the film dried without the adducts. This shows the ease of crosslinking even at room temperature, of polymers made with o-AA mer units.

The self thickening capability of Example 7(h) is demonstrating by adjusting the pH with sodium hydroxide and determining the viscosity. The viscosities at pH 2.5, 4.4, and 7.1 respectively is 70, 200 and 1260 cps., respectively. There is no observable pH drift on aging the samples overnight at room temperature. Such a pH drift is often observed with other self-thickening copolymer emulsions. The lack of pH drift is also evidence of the stability with respect to hydrolysis of the polyester linkages in the o-AA mer units in the polymer.

EXAMPLE 8

Copolymers of o-AA with Styrene and Vinyl Acetate

Conventional emulsion polymerization is used to prepare the copolymers described below:

|  | 8(a) | 8(b) | 8(c) |
|---|---|---|---|
| VAc | 80 pts | 50 pts | — |
| St | — | — | 50 pts |
| o-AA | 20 pts | 50 pts | 50 pts |
| Tg (°C.) | +13 | −8 | +26 |

Homopolymers of vinyl acetate and of styrene have Tg values in the neighborhood of 30° C. and 100° C. respectively so these data illustrate the marked lowering of Tg achieved by copolymerization with o-AA.

EXAMPLE 9

Hydrolytic Stability of o-AA Copolymers

Acid titer of Examples 7(a) and 7(b), a control and a 20% o-AA copolymer analog, determined by non-aqueous potentiometric titration with tetrabutylammonium hydroxide in methanol, agreed closely with expected values based on initial acid charge, indicating that little or no hydrolysis of the o-AA monomer occurred during the polymerization at 80°–85° C., pH=2.5–4.0.

The polymer emulsion of Example 7(b) in excess aqueous NaOH showed virtually quantitative hydrolysis of o-AA in about 30 minutes at room temperature.

EXAMPLE 10

Hydrophilic Copolymers of o-AA

EA and VAc copolymers with 20 and 50% o-AA, made by emulsion polymerization, are compared with EA/AA=80/20 in respect to $T_{300}$ and swelling of air-dried films in water at pH 7. $T_{300}$ data show the softening effect of o-AA in copolymers and the stiffening effect of acrylic acid in a copolymer with EA. The EA/AA copolymer has about a 20% higher acid titer than the EA/o-AA 50/50 copolymer, which may account for the difference in swell ratios (S.R.) of the two polymers in water at pH 7.

| Example | Swell Ratio of EA and VAc Copolymers of o-AA in Water at pH 7 | | |
|---|---|---|---|
|  | Polymer[1] | $T_{300}$ | S.R. |
| 10(a) | EA/o-AA = 50/50 | −26 | 2.9 |
| 10(b) | EA/o-AA = 80/20 | −18 | 1.8 |
| 10(c) | VAc/o-AA = 50/50[2] | −8 | 4.8 |
| 10(d) | VAc/o-AA = 80/20[2] | +13 | 5.2 |
| 10(e) | EA/AA = 80/20 | +6 | 17.6 |

The Tg of VAc homopolymer is about 30° C. [1]o-AA, 4.7 ME/g
[2]ca. 90% conversion

EXAMPLE 11

Solution and Bulk Polymerization of o-AA

Polymerization recipes for solution and bulk polymerization of o-AA are shown below. The o-AA sample is prepared as in Example 2b with n about 2.0, by acid titer.

| Ingredients | EXAMPLE | | |
|---|---|---|---|
|  | 11(a) | 11(b) | 11(c) |
| o-AA | 5.0 pts. | 5.0 pts. | 5.0 pts. |
| diacetone alcohol | 12 | — | — |
| toluene | — | 12.0 | — |
| t-butyl perpivalate (75%) | 0.25 | 0.25 | 0.25 |
|  | 17.25 | 17.25 | 5.25 |

The o-AA used in this example is analyzed by GPC and is found to have component molecules as follows:

| n: | 0 | 1 | 2 | 3 | 4 | 5 | 6 or more |
|---|---|---|---|---|---|---|---|
| wt %: | 7 | 16 | 16 | 13 | 12 | 17 | 20 |

The n for this example is 2.

Procedure

The ingredients are charged to vials which are flushed with $N_2$, sealed with a screw-on cap and placed in a 60° C. bath for 24 hours.

Results

The polymer solution from recipe 11(a) is at 22% solids (75% conversion), free of suspended matter. The solution viscosity is 350 cps.

Polymerization in toluene, in which the o-AA is only partially soluble, Example 11(b), results in insoluble solid polymer in the bottom of the vial and a clear upper solvent phase.

The bulk polymer of Example 11(c) is a soft, rubbery solid, soluble in acetone and dilute aqueous $NH_4OH$.

EXAMPLE 12

Concentration Dependence of Viscosity

The viscosity as a function of concentration is determined for the copolymer of Example 6(c) and a control made with AA in place of o-AA, each having been solubilized by being brought to a pH of 8.2 with 28% aqua ammonia after dilution. Measurements of the viscosity were made in the concentration range of 1% to about 5% by means of the Brookfield ® RVF Viscometer employing the spindle and speed of revolution indicated in the table heading below. The measured viscosity is tabulated in thousands of centipoise.

| Example 6(c) | | | AA control | | |
|---|---|---|---|---|---|
| | Spindle/Speed | | | Spindle/Speed | |
| % solids | 6/20 rpm | 7/10 rpm | % solids | 6/20 rpm | 7/10 rpm |
| 1.0 | — | 2.0 | 1.0 | — | 6.0 |
| 1.25 | — | 4.0 | — | | |
| 1.50 | 3.5 | 8.0 | 1.4 | 4.625 | 12.0 |
| 1.75 | 5.5 | 14.0 | — | | |
| 2.0 | 7.5 | 18.0 | — | | |
| 2.5 | 9.0 | 24.0 | — | | |
| 2.75 | 10.5 | — | 2.8 | 9.0 | 24.0 |
| 3.0 | 14.5 | 32.0 | — | | |
| 3.5 | 19.0 | 48.0 | — | | |
| 3.75 | 19.0 | — | — | | |
| 4.0 | 23.0 | 52.0 | 4.2 | 13.25 | 33.0 |
| 4.6 | 25.0 | 60.0 | — | | |

It is seen that at both shear rates the polymer having o-AA units has a higher viscosity at high concentrations than the control polymer employing AA units. Because of the inherently far higher average molecular weight of the o-AA than the AA, it is clear that the former is far more efficient than the latter, on a molar basis, in promoting the thickening effect of the copolymer. A corollary of this is that the o-AA copolymer employs far less neutralizing agent to achieve the same pH.

EXAMPLE 13

A Fabric Print Paste Utilizing o-AA Thickener

A fabric print paste is made utilizing an o-AA copolymer as the sole binder-thickener for the print clear. The print paste is prepared and tested as follows:

| Printing Paste Formulation and Properties | | |
|---|---|---|
| | Ingredient | Parts by Wt. |
| Clear: | Water | 157.4 |
| | Binder Ex. 6(c) (23% solids) | 40.0 |
| | $NH_4OH$ | 2.6 |
| | pH | 8.1 |
| | Viscosity[1] (7/10) | 58,000 |
| | (6/20) | 22,000 |
| Print Paste: | Clear | 98.50 |
| | Aerotex® M-3 | 0.90 |
| | Aqua Hue Blue BGG 9521 | 10.00 |
| | Viscosity[1] (7/10) | 50,000 |
| | (6/20) | 20,500 |

[1]Brookfield RVF Viscosity, cps, spindle/RPM

The printing paste is struck off onto 65:35 polyester/cotton poplin using a laboratory automatic flatbed screen printing machine. The sample is simultaneously dried and cured 5 minutes at 300° F., conditioned at 70° F. and 60% relative humidity before testing which results in the following observations pursuant to procedures well known in the art:

| | Print Properties |
|---|---|
| Strikethrough | none |
| Haloing | none |
| Handle | Sl. stiffer than Rhoplex® E-32 (Rohm and Haas Co. commercial standard) |
| AATCC[2] Crockfastness (Test 116-1969) | |
| Dry[1] | 3.5 |
| Wet[1] | 2.0 |
| AATCC[2] Washfastness (ISO gray scale[1] Test 61-1969) | 4.0 |

[1]1 = worst, 5 = best
[2]American Association of Textile Chemists and Colorists It is seen that using the o-AA as the sole thickener/binder produces a fabric with a fairly soft hand, no haloing, little strike-through, good color depth, fair crockfastness and good color fastness to home laundering. Particularly noteworthy is that the viscosity of the clear was depressed only about 10% on conversion into a deep shade print paste.

EXAMPLE 14

Nonwoven Fabric Binder

Polymer emulsions, prepared by the usual emulsion polymerization techniques, are formulated to 15% binder solids made by employing the appropriate amount of water and 108 parts latex solids, 2 parts Aerotex® M-3 crosslinker, a melamine aminoplast from American Cyanamide Co., 0.65 parts ammonium nitrate, 2 parts octylphenoxypoly(8.7)ethoxyethanol. The carded polyester web is unbonded Dacron® type 54W, merge 113505 1.5 denier, 1.5 inch (3.8 cm) staple, 1 ounce/square yard (34 g/m²). The web is supported between two layers of Fiberglass scrim and saturated with the above 15% binder solids bath on a Birch Brothers padder at 25 pounds per liner inch (4.5 kg/cm) nip pressure with a speed of 6.9 m/min. The padded webs are dried for 5 minutes at 66° C. in a forced air oven and cured for 1.5 minutes at 150° C. The polymer compositions employed are: Example 14a: 62.5 EA/25.5 BA/4.5 AN/2.5 MlAM/5.0 o-AA (n=2) and Example 14b, the control: 66 EA/25.5 BA/4.5 AN/2.5 MlAM/1.5 IA. The conditions for applying the binder are selected to obtain an addon in the range of about 65 to 85% by weight of dry binder based on the weight of the fiber used.

As a measure of fabric wet abrasion resistance, i.e., the ability of the web to withstand repeated wash cycles 25×23 centimeter samples of the fabric sewn onto a 38×38 cm $80^2$ cotton printcloth, together with 8 terrycloth towels for ballast, are washed for 5 cycles in a Maytag home launderer at full cycle wash setting with hot (60° C.) water containing a half cup of ORVUS ® (Procter & Gamble) detergent. At the end of the 5 wash cycles the fabric of Experiment 14a exhibited slight fiber lift and pilling whereas the control, Example 14b, exhibited heavy fiber lift and pilling; each fabric has an 85% binder addon.

Solvent resistance is demonstrated by subjecting similar fabric samples to 5 dryclean cycles in a coin-operated drycleaning machine (Speed Queen) containing terry toweling ballast and having Dowper ® CS (Dow Chemical Co., perchlorethylene containing small amounts of detergent and water) as the drycleaning solvent. At 67% addon the fabric of Example 14a exhibited slight fiber lift and moderate pilling after 5 dryclean cycles. At 70% addon the fabric of Experiment 14b exhibited heavy fiber lift and pilling and delamination after 5 dryclean cycles.

It is clear that at approximately the same acid content, Experiment 14a 0.18 ME/g versus Experiment 14b 0.23 ME/g, that the o-AA sample outperforms the control in both wash resistance and dryclean resistance. It should be further noted that attempts to improve the resistance properties of the control by increasing the level of IA in the sample lead to a higher Tg and a stiffer sample or undesirably harsher hand.

We claim:

1. In a method of preparing a free-radical addition polymer comprising polymerizing one or more ethylenically unsaturated monomers by solution or emulsion polymerization, the improvement wherein a monomer of the formula

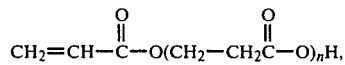

in which the average value of n ($\bar{n}$) is in the range from greater than 1 to about 10, is polymerized, optionally with one or more comonomers; less than 5%, by weight, of the comonomers being polyunsaturated.

2. In a method of preparing a free-radical addition polymer comprising polymerizing one or more ethylenically unsaturated monomers, the improvement wherein a monomer of the formula

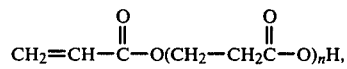

in which the average value of n ($\bar{n}$) is about 2 or greater, is polymerized, optionally with one or more comonomers; less than 5%, by weight, of the comonomers being polyunsaturated.

3. The method of claim 2 in which the one or more comonomers is copolymerized with at least 0.01% of the monomer of the formula and $\bar{n}$ is about 2 to about 5.

4. The method of claim 3 in which at least one of the comonomers is an ester of acrylic acid or an ester of methacrylic acid.

5. The method of claim 4 in which 0.5–75% of the monomer of the formula is copolymerized.

6. The method of claim 5 in which said ester of acrylic acid or said ester of methacrylic acid is a ($C_1$–$C_{18}$) alkyl ester, the copolymer containing 1–25% of the monomer of the formula and polymerizing is by emulsion polymerization.

7. The method of claim 6 in which the alkyl ester is a ($C_1$–$C_8$) alkyl ester.

8. The method of claim 6 comprising additionally one or more comonomers selected from the group consisting of a (meth)-acrylamide, a (meth)acrylonitrile, a dimethylaminoethyl (meth)-acrylate, a ($C_2$–$C_4$) diol di(meth)acrylate, a hydroxy ($C_2$–$C_3$) alkyl (meth)acrylate, itaconic acid, a (meth)acrylic acid, maleic anhydride, diallyl phthalate, an allyl (meth)acrylate, divinyl benzene, an N-methylol (meth)acrylamide, an oxazolidinylethyl (meth)acrylate, styrene, vinyl toluene, sodium vinyl sulfonate, a t-butylaminoethyl (meth)acrylate, vinyl acetate, vinyl chloride, vinylidene chloride, 4-vinylpyridine, propylene, and ethylene is utilized.

9. A polymer made by the process of claim 1, 2, 3, 4, 5, 6, 7, or 8.

10. An article of manufacture containing a polymer made by the method of claim 1, 2, 3, 4, 5, 6, 7, or 8.

* * * * *

UNITED STATES PATENT AND TRADEMARK OFFICE
CERTIFICATE OF CORRECTION

PATENT NO. : 4,359,564

DATED : November 16, 1982

INVENTOR(S) : Richard F. Merritt and Bjorn E. Larsson

It is certified that error appears in the above—identified patent and that said Letters Patent is hereby corrected as shown below:

Column 12, Line 63, "(n=2)" should read -- ($\bar{n}$=2) --.

Signed and Sealed this

Twenty-sixth Day of June 1984

[SEAL]

*Attest:*

GERALD J. MOSSINGHOFF

*Attesting Officer*     *Commissioner of Patents and Trademarks*